United States Patent [19]

Becker

[11] Patent Number: 4,487,460

[45] Date of Patent: Dec. 11, 1984

[54] BUSHING ASSEMBLY FOR PRELOADING A THRUST BEARING

[75] Inventor: Manfred Becker, Frankenthal, Fed. Rep. of Germany

[73] Assignee: Deere & Company, Moline, Ill.

[21] Appl. No.: 535,494

[22] Filed: Sep. 26, 1983

Related U.S. Application Data

[63] Continuation-in-part of Ser. No. 364,598, Apr. 2, 1982, abandoned.

[30] Foreign Application Priority Data

Apr. 9, 1981 [EP] European Pat. Off. ........ 81301557.5

[51] Int. Cl.³ .................. F16C 25/06; F16C 33/08
[52] U.S. Cl. ................................................. 384/620
[58] Field of Search ........... 308/184 A, 189 R, 207 R, 308/207 A, 189 A, 219, 227, 229–234; 384/280, 276, 281, 295, 127, 420; 411/402–404, 410, 411, 395

[56] References Cited

U.S. PATENT DOCUMENTS

| 933,627 | 9/1909 | Courtney | 308/189 A |
|---|---|---|---|
| 1,232,750 | 7/1917 | Amess | 308/207 A |
| 1,401,349 | 12/1921 | Miquet | 308/189 A |
| 1,671,682 | 5/1928 | Norris | 308/207 A |
| 1,910,182 | 5/1933 | Robertson | 411/410 |
| 2,997,350 | 8/1961 | Gerner | 384/295 |
| 3,456,548 | 7/1969 | Schmidt et al. | 411/403 |
| 3,866,510 | 2/1975 | Eibes et al. | 411/418 |

Primary Examiner—John M. Jillions
Assistant Examiner—David Werner

[57] ABSTRACT

An improved bushing assembly which includes a housing having a cylindrical bore formed therein. A bushing is engageable in the cylindrical bore of the housing and is journaled onto a rotatable shaft which extends out of the housing so as to be attached to a drive mechanism. The bushing contains a smooth internal bore and has a stepped outer circumferential profile. The profile includes a smooth circular lead-in surface with an external diameter approximately equal to the diameter of the cylindrical bore, a larger diameter surface containing self-tapping threads for positively engaging an inner portion of the housing which surrounds the cylindrical bore, and a collar formed adjacent to the threads and opposite to the lead-in surface. The collar has a tool receiving configuration so as to accept a tool for threading the bushing into the cylindrical bore. A thrust bearing is mounted on the rotatable shaft and is sandwiched between a shoulder on the shaft and the lead-in end of the bushing. By threading the bushing into the cylindrical bore, one is able to obtain a desired preload on the thrust bearing thereby assuring accurate positioning of the rotatable shaft.

7 Claims, 5 Drawing Figures

BUSHING ASSEMBLY FOR PRELOADING A THRUST BEARING

CROSS REFERENCE TO RELATED APPLICATION

This application is a continuation-in-part of U.S. application Ser. No. 364,598 filed 2 Apr. 1982, (now abandoned).

FIELD OF THE INVENTION

This invention relates to an improved bushing assembly for journaling a rotatable shaft in a support housing.

BACKGROUND OF THE INVENTION

A bushing is a cylindrical liner which is normally used as a guide to axially align a rotatable member, such as a shaft. Although most bushings have smooth external surfaces, some have been manufactured with a threaded bore which provides a threaded hole for receiving a stud or a plug. These types of bushings are either slotted or otherwise formed to facilitate their thread cutting action. Although these bushings are useful for specialized purposes, they leave much to be desired in the way of axially aligning a smooth shaft within a housing. Up until now, it has been necessary to machine a counterbore into the housing to receive the bushing or to align the bushing within the housing by means of splines or other types of supporting members. Now an improved bushing assembly has been developed which permits a bushing to be physically positioned within a housing such that exact axial positioning of the journaled shaft is possible.

SUMMARY OF THE INVENTION

Briefly, this invention relates to an imroved bushing assembly including a bushing with self-tapping threads. The bushing itself is designed to be secured to a housing so that it can support a rotatable shaft which is journaled to it. The bushing has a smooth axially aligned interior bore and a stepped exterior configuration. The stepped exterior configuration includes a smooth circular lead-in surface with an external diameter approximately equal to the inside diameter of an engageable cylindrical bore and a larger diameter surface having self-tapping threads formed thereon for positively engaging an inner portion of the housing. At one end of the improved bushing, preferably the outward projecting end, is a tool receiving profile which enables the bushing to be screwed into the cylindrical bore of the housing. By threading the improved bushing into the cyindrical bore, one is able to axially align the journaled shaft within the housing. In addition, when the bushing is used in conjunction with a stepped shaft having a shoulder, the bushing can be threaded into the housing such that it pre-loads a thrust bearing positioned between the shoulder of the shaft and the inner end of the thrust bearing.

A general object of this invention is to provide an improved bushing assembly which has a bushing with self-tapping threads. A more specific object of this invention is to provide an improved bushing assembly which will axially position a journaled shaft within a bore and which can be used to pre-load a thrust bearing mounted on the journaled shaft.

Another object of this invention is to provide an improved bushing assembly which is economical to manufacture and simple to install.

Still further, an object of this invention is to provide an improved bushing assembly having a bushing which can be threadedly attached to a support housing to support a journaled shaft therethrough.

Other objects and advantages of the present invention will become more apparent to those skilled in the art in view of the following description and the drawings.

DETAILED DESCRIPTION OF THE PREFERRED EMBODIMENTS

Figure 1:
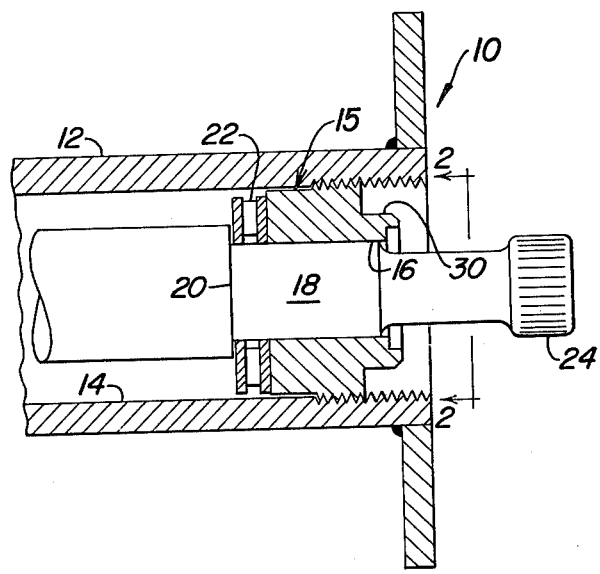
FIG. 1 is a cross-sectional view of the improved bushing assembly.

Referring to FIG. 1 an improved bushing assembly 10 is shown which includes a housing 12 having an elongated cylindrical bore 14. A bushing 15, having a smooth axially aligned internal bore 16, is positioned within the bore 14 and suppots a journaled rotatable shaft 18. The rotatable shaft 18 is shown having a multi-step configuration with a shoulder 20 located therebetween which acts as a stop for a thrust bearing 22. The thrust bearing 22 preferably has an outside diameter which is smaller than the diameter of the cylindrical bore 14 and has a plurality of needle rollers radially aligned relative to the axis of the cylindical bore 14. The rotatable shaft 18 that passes through the bushing 15 has a splined head 24 at one end which can be used as an attachment to a drive mechanism, such as a steering pump.

Figures 2, 3:
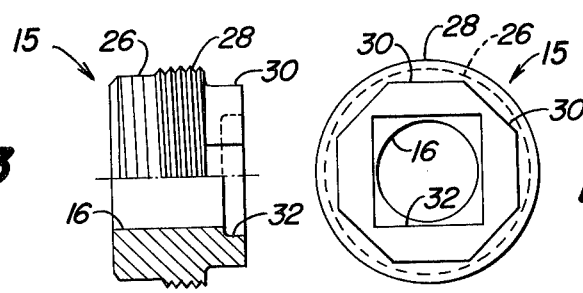
FIG. 2 is an end view of the bushing shown in FIG. 1.
FIG. 3 is a partial sectional side view of FIG. 2.

The bushing 15, best shown in FIGS. 2 and 3, contains a stepped outer circumferential surface having a smooth circular lead-in surface 26 and a larger diameter circumferential surface 28. The lead-in surface 26 has an external diameter approximately equal to the inside diameter of the cylindrical bore 14 while the larger diameter surface 28 contains self-tapping helical threads which positively engage the inner portion of the housing 12. The lead-in surface 26 facilitates the engagement of the bushing 15 into the cylindrical bore 14 such that a true alignment results. By a true alignment is meant that the axis of the bushing 15 is coincident with the axis of the cylindrical bore 14. For purposes of manufacturing, it is possible to thread the entire outer diameter of the bushing 15 and then to machine off a portion of the threads to obtain the smooth lead-in surface 26.

The bushing 15 also contains an integral collar 30 which is formed adjacent to the threads 28 and has a profile for receiving a driving tool. The collar 30 is shown having a hexagonal exterior configuration which is smaller than the diameter of the threads and which can accommodate a socket wrench. In addition, an internal cavity 32 is formed in one end of the bushing 15 for receiving various configured tools, for example a screwdriver. In FIG. 2 the cavity 32 is shown having a square configuration for receiving a square headed tool by which the bushing 15 can be screwed into the housing 12.

Figures 4, 5:
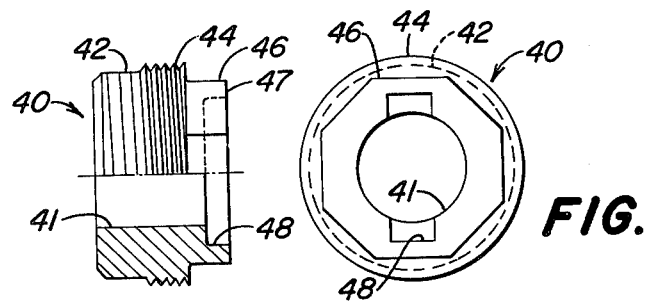
FIG. 4 is an end view of an alternative embodiment of the bushing.
FIG. 5 is a partial sectional side view of FIG. 4.

Referring to FIGS. 4 and 5, an alternative embodiment for a bushing 40 of the bushing assembly 10 is shown having a smooth internal bore 41 through which the shaft 18 can be journaled. The bushing 40 is similar to the bushing 15 in that it contains a smooth circular lead-in surface 42, a larger diameter self-tapping threaded surface 44 and an outward projecting collar 46. However, an outside end 47 of the collar 46 contains an elongated, narrow slot 48 which is adapted to receive the driving blade of a tool, such as the tip of a screwdriver. The bushings 15 and 40 are preferably manufactured from a material that will retain its shape as it is screwed into the housing 12. This is important because considerable force is usually required to screw the bushing 15 or 40 into the housing 12 so that a high frictional force can be created to keep the bushing firmly in place. This feature makes the improved bushing assembly 10 novel because the axial position of the bushing 15 or 40 can be adjusted and maintained to enable the thrust bearing 22 to be pre-loaded to a desired value.

While the invention has been described in conjunction with two specific embodiments, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. An improved bushing assembly comprising:
   (a) a housing having a cylindrical bore formed therein;
   (b) a bushing engageable in said cylindrical bore having a smooth internal bore and a stepped outer circumferential profile, said profile including a smooth circular lead-in surface with an external diameter approximately equal to the diameter of said cylindrical bore, a larger diameter surface containing self-tapping threads for positively engaging an inner portion of said housing surrounding said cylindrical bore, and a collar formed adjacent to said threads and opposite to said lead-in surface, said collar having an external configuration smaller than the outside diameter of said threads;
   (c) a rotatable shaft journaled in said internal bore of said bushing, said shaft having a stepped configuration with a shoulder formed therebetween, and a splined end protruding beyond said cylindrical bore of said housing to which a drive mechanism can be attached;
   (d) a thrust bearing mounted on said rotatable shaft and sandwiched between said shoulder of said shaft and the lead-in end of said bushing, said thrust bearing having an outside diameter which is smaller than the diameter of said cylindrical bore; and
   (e) tool receiving means formed in said collar for receiving a tool which enables said bushing to be threaded into said housing a predetermined amount such that a desired pre-load can be applied to said thrust bearing.

2. The improved bushing assembly of claim 1 wherein said self-tapping threads are helical screw threads.

3. The improved bushing assembly of claim 1 wherein said tool receiving means is an internal cavity having a configuration mateable with a driving tool.

4. The improved bushing assembly of claim 3 wherein said internal cavity has a square configuration for receiving a square headed tool.

5. The improved bushing assembly of claim 3 wherein said internal cavity is an elongated, narrow slot for receiving a screwdriver.

6. The improved bushing assembly of claim 1 wherein said tool receiving means is formed on both an exterior and an interior surface of said collar for alternatively receiving a tool to enable said bushing to be threaded into said housing.

7. The improved bushing assembly of claim 1 wherein said thrust bearing contains a plurality of needle rollers aligned radially relative to the central axis of said rotatable shaft.

* * * * *